US009315605B2

(12) United States Patent
Lee et al.

(10) Patent No.: US 9,315,605 B2
(45) Date of Patent: Apr. 19, 2016

(54) METHOD FOR PRODUCING AN ELASTOMER USING A TRANSITION METAL CATALYST

(75) Inventors: Eun-Jung Lee, Daejeon (KR); Sung-Soo Park, Seoul (KR); Beom-Doo Seo, Daejeon (KR); Cheon-Il Park, Daejeon (KR); Choong-Hoon Lee, Daejeon (KR); Jong-Joo Ha, Daejeon (KR); Jung-A Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 18 days.

(21) Appl. No.: 13/340,404

(22) Filed: Dec. 29, 2011

(65) Prior Publication Data

US 2012/0108772 A1    May 3, 2012

Related U.S. Application Data

(63) Continuation of application No. PCT/KR2010/004199, filed on Jun. 29, 2010.

(30) Foreign Application Priority Data

Jul. 1, 2009 (KR) .................. 10-2009-0059595

(51) Int. Cl.
| | |
|---|---|
| *C08F 4/6592* | (2006.01) |
| *C08F 4/642* | (2006.01) |
| *C08F 4/643* | (2006.01) |
| *C08F 210/16* | (2006.01) |
| *C08F 236/00* | (2006.01) |
| *C08F 210/06* | (2006.01) |
| *C08F 10/00* | (2006.01) |
| *C08F 210/18* | (2006.01) |
| *C08F 4/659* | (2006.01) |

(52) U.S. Cl.
CPC ............ *C08F 210/06* (2013.01); *C08F 4/6592* (2013.01); *C08F 10/00* (2013.01); *C08F 210/18* (2013.01); *C08F 236/00* (2013.01); *C08F 4/65908* (2013.01); *C08F 4/65912* (2013.01); *C08F 2420/01* (2013.01)

(58) Field of Classification Search
CPC ............ C08F 4/65901; C08F 4/65912; C08F 4/6592; C08F 210/16
USPC .................. 526/133, 134, 160, 165, 339, 943
See application file for complete search history.

(56) References Cited

U.S. PATENT DOCUMENTS

| | | | |
|---|---|---|---|
| 4,840,663 A | 6/1989 | Quadranti et al. | |
| 5,229,478 A | 7/1993 | Floyd et al. | |
| 6,046,287 A | 4/2000 | Galimberti et al. | |
| 6,225,426 B1 * | 5/2001 | Gillis et al. | 526/160 |
| 2002/0123581 A1 * | 9/2002 | Schertl et al. | 526/127 |
| 2007/0225158 A1 * | 9/2007 | Lee et al. | 502/152 |
| 2010/0179291 A1 * | 7/2010 | Lee et al. | 526/159 |

FOREIGN PATENT DOCUMENTS

| | | |
|---|---|---|
| CN | 1102415 | 5/1995 |
| CN | 100389129 C | 5/2008 |
| CN | 101213218 A | 7/2008 |
| JP | 09-151205 | 6/1997 |
| JP | 2002-249521 | 9/2002 |
| JP | 2008-527050 | 7/2008 |
| JP | 2010-526930 | 8/2010 |
| KR | 96-000549 B1 | 1/1996 |
| KR | 10-2000-0023740 A | 4/2000 |
| KR | 10-0820542 B1 | 4/2008 |
| KR | 10-2008-0101701 | 11/2008 |
| WO | 2008/084931 | 7/2008 |
| WO | 2008/140205 | 11/2008 |
| WO | WO 2008/140280 | 11/2008 |

OTHER PUBLICATIONS

Dae Joon Cho, et al.; "o-Phenylene-Bridged Cp/Amido Titanium Complexes for Ethylene/1-Hexene Copolymerizations"; In: Organometallics Mar. 2006, vol. 25, pp. 2133-2134.
Aleksander Ostoja Starzewski, et al.; "Decisive Progress in Metallocene-Catalyzed Elastomer Synthesis"; In: Macromolecules May 2008, vol. 41, pp. 4095-4101.
J. Polm. Sci. vol. 23, pp. 2151-2164 (1985).

* cited by examiner

*Primary Examiner* — Caixia Lu
(74) *Attorney, Agent, or Firm* — Dentons US LLP

(57) ABSTRACT

The present invention relates to a method of producing an elastomer. Specifically, the method of producing an elastomer according to the present invention comprises a step of polymerizing ethylene, propylene, and optionally, a diene monomer in the presence of a catalyst composition containing a transition metal compound. The method of producing an elastomer according to the present invention makes it possible to prepare a high molecular weight, ethylene-propylene or ethylene-propylene-diene, elastic copolymer at a high temperature.

6 Claims, No Drawings

METHOD FOR PRODUCING AN ELASTOMER USING A TRANSITION METAL CATALYST

This application is a Continuation of International Application No. PCT/KR2010/004199, filed Jun. 29, 2010, and claims the benefit of Korean Application No. 10-2009-0059595, filed on Jul. 1, 2009, which is hereby incorporated by reference for all purposes as if fully set forth herein.

TECHNICAL FIELD

The present invention relates to a method of producing an elastomer. Specifically, the present invention is directed to a method of producing a high molecular weight, ethylene-propylene or ethylene-propylene-diene, elastic copolymer at a high temperature.

BACKGROUND OF THE ART

"An Elastomer," as first defined in 1940, refers to a synthetic thermosetting advanced polymer with properties similar to those of vulcanized natural rubbers, for example, capable of being elongated at least two times its original length and very quickly contracting into the almost same length as the original one when being released.

Among the most commonly available polyolefin elastomers prepared in these days are a copolymer of ethylene and propylene (EP) and a hybrid terpolymer of ethylene, propylene, and a diene monomer (EPDM).

In the past, soluble vanadium catalysts such as $VCl_4$, $VOCl_3$, and $VO(AC)_3$ were used for the production of polyolefinic elastomers. However, the vanadium catalyst has a low catalytic activity, which becomes even lower, especially, in the presence of a diene monomer as included. In addition, if the residual amount of vanadium (V) in the polymer is equal to or greater than 10 ppm, it can lead to coloration of the polymers and the toxicity thereof, necessitating a further step of de-ashing the catalyst during the process. In contrast, metallocene catalysts are composed of a transition metal atom as inserted between cyclic structures. Polymers prepared from the metallocene catalysts are advantageous in that they are superior in impact strength and toughness and are likely to show good melting properties and improved transparency in films. Although the metallocene catalyst itself is more expensive than the conventional Ziegler-Natta catalyst, not only does it have a superb productivity, making the de-ashing step unnecessary, but also it can provide a higher degree of copolymerization for propylene or a diene monomer, allowing the production of a wide range of copolymers. Moreover, the polymerization can be conducted at a higher temperature in comparison with the vanadium catalyst such that the metallocene catalysts are very advantageous in the production of EPDM from a process-relating perspective.

In *J. Polm. Sci.* vol. 23, pp. 2151-64 (1985), Kaminsky disclosed a use of a soluble catalyst system of bis(cyclopentadienyl)zirconium dimethyl aluminoxane for a solution polymerization of EP and EPDM elastomers. U.S. Pat. No. 5,229,478 disclosed a slurry polymerization method by using a similar catalyst system of bis (cyclopentadienyl)zirconium.

The conventional catalyst system has drawbacks that preparing EP and EPDM elastomers in the presence of such a catalyst system requires an enhanced reactivity of the diene monomers, which were mentioned in U.S. Pat. No. 5,229,478 but have yet to be resolved. Factors having an effect on the availability of EP and EPDM include the production costs as well as the cost of diene monomers. Diene monomers are typically more expensive than ethylene or propylene. Moreover, the reactivity between diene monomers and the previously known metallocene catalyst is lower than that of ethylene or propylene. Therefore, in order for the diene monomers to be incorporated to such an extent required for the preparation of the EPDM at a high curing rate, they should be used at a substantially higher concentration than the diene content as aimed to be actually incorporated into the final EPDM product. Considerable amount of the unreacted diene monomers should be recovered from the effluent of the polymerization reactor for their reuse, and this incurs an unnecessary additional cost for the production.

Moreover, what makes the cost of EPDM even higher is the fact that when the catalyst for an olefinic polymerization is exposed to the diene monomer, especially, of an increased concentration as required for incorporating the diene to the desired extent in the final EPDM product, it may often suffer a decrease in a rate or an activity for carrying out the polymerization of the ethylene and propylene monomers. Therefore, EPDM has a lower productivity and requires a longer time for the polymerization reaction than the ethylene-propylene elastomers or other α-olefinic elastic copolymers.

Since the aluminoxane-activated metallocene catalyst was introduced for producing polyethylene, polypropylene, and a ethylene/α-olefin copolymer, many efforts have been made to employ such catalyst for the production of elastomers. Yet, there has been no known method of producing a high-molecular weight elastomer with a high yield within a reasonable time for the polymerization reaction.

SUMMARY OF THE INVENTION

The present invention provides a method of producing a high-molecular weight, ethylene-propylene or ethylene-propylene-diene elastomer at a higher temperature in the presence of a catalyst composition comprising a transition metal compound.

The present invention provides a method of producing an elastomer, which comprises a step of polymerizing ethylene, propylene, and optionally a diene monomer in the presence of a catalyst composition comprising a transition metal compound as represented by Chemical Formula 1 as follows:

[Chemical Formula 1]

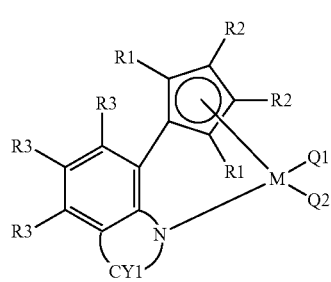

In Chemical Formula 1,

R1 and R2 are the same with or different from each other, and are independently hydrogen; a C1 to C20 alkyl radical; a C2 to C20 alkenyl radical; a C6 to C20 aryl radical; a silyl radical; a C7 to C20 alkylaryl radical; a C7 to C20 arylalkyl radical; or a metalloid radical of a Group IV metal substituted with a hydrocarbyl group, respectively; and R1 and R2 or two R2s can be linked to each other by an alkylidine radical including a C1 to C20 alkyl or a C6 to C20 aryl radical to form a ring;

R3s are the same with or different from each other, and are independently hydrogen; a halogen radical; a C1 to C20 alkyl radical; a C2 to C20 alkenyl radical; a C6 to C20 aryl radical; a C7 to C20 alkylaryl radical; a C7 to C20 arylalkyl radical; a C1 to C20 alkoxy radical; a C6 to C20 aryloxy radical; or an amido radical, respectively; and two or more of the R3s can be linked to each other to form an aliphatic ring or an aromatic ring;

CY1 is an aliphatic or aromatic ring, unsubstituted or substituted with a halogen radical; a C1 to C20 alkyl radical; a C2 to C20 alkenyl radical; a C6 to C20 aryl radical; a C7 to C20 alkylaryl radical; a C7 to C20 arylalkyl radical; a C1 to C20 alkoxy radical; a C6 to C20 aryloxy radical; or an amido radical, and when it has a plurality of the substituents, two or more of them can be linked to each other to form an aliphatic ring or an aromatic ring;

M is a Group IV transition metal; and

Q1 and Q2 are the same with or different from each other, and are independently a halogen radical; a C1 to C20 alkyl radical; a C2 to C20 alkenyl radical; a C6 to C20 aryl radical; a C7 to C20 alkylaryl radical; a C7 to C20 arylalkyl radical; a C1 to C20 alkyl amido radical; a C6 to C20 aryl amido radical; or a C1 to C20 alkylidene radical, respectively.

Further, the present invention provides an elastomer prepared by the foregoing production method of the elastomer.

DETAILED DECRIPTION OF THE EMBODIMENTS OF THE INVENTION

Hereinafter, the embodiments of the invention will be explained in detail.

The production method of the elastomer according to the present invention is characterized in that it comprises the step of polymerizing ethylene, propylene, and optionally a diene monomer in the presence of a catalyst composition comprising a transition metal compound represented by Chemical Formula 1 as above.

Unlike the conventional transition metal compounds, the transition metal compound represented by Chemical Formula 1 according to the present invention has a firm pentagonal ring structure that is maintained very securely in the periphery of the metal site by quinoline amido groups, thereby structurally being easy of access for the monomers, and thus a catalyst composition comprising such transition metal compound may exhibit an excellent reactivity in the copolymerization between ethylene and a sterically-hindered monomer. Therefore, the transition metal compound represented by Chemical Formula 1 can provide a relatively superior degree of the copolymerization between propylene and the diene monomer to other transition metal compound, and especially it allows for the production of EP and EPDM at a high temperature of at least 100° C. with a high yield.

More specific explanation as to the transition metal compound as represented by Chemical Formula 1 is as follows.

In Chemical Formula 1, the hydrocarbyl group represents a monovalent group such as ethyl and phenyl groups, formed by removing a hydrogen atom from a hydrocarbon.

In Chemical Formula 1, the metalloid represents an element showing intermediate properties between metals and non-metals, and includes arsenide, boron, silicon, tellurium, and the like.

In light of a control over an electronic and a steric environment surrounding the metal, the examples of the transition metal compounds of Chemical Formula 1 include a transition metal compound represented by Chemical Formula 2 or Chemical Formula 3 as follows:

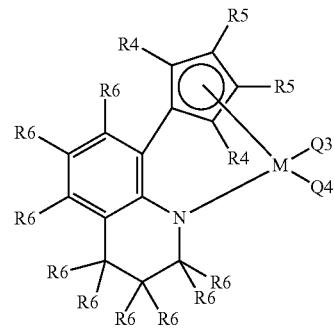

[Chemical Formula 2]

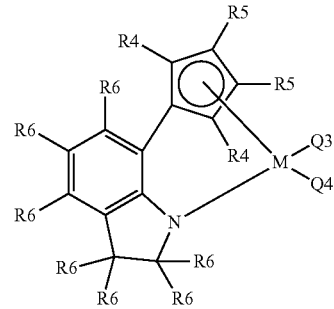

[Chemical Formula 3]

In Chemical Formula 2 and Chemical Formula 3,

R4 and R5 are the same with or different from each other, and are independently hydrogen; a C1 to C20 alkyl radical; a C6 to C20 aryl radical; or a silyl radical, respectively;

R6s are the same with or different from each other, and are independently hydrogen; a C1 to C20 alkyl radical; a C2 to C20 alkenyl radical; a C6 to C20 aryl radical; a C7 to C20 alkylaryl radical; a C7 to C20 arylalkyl radical; a C1 to C20 alkoxy radical; a C6 to C20 aryloxy radical; or an amido radical, respectively; and two or more R6s can be linked to each other to form an aliphatic or aromatic ring;

Q3 and Q4 are the same with or different from each other, and are independently a halogen radical; a C1 to C20 alkyl radical; a C1 to C20 alkyl amido radical; or a C6 to C20 aryl amido radical, respectively; and M is a transition metal of Group IV.

Examples for the compound of Chemical Formula 1 in light of controlling the electronic and steric environment surrounding the metal include transition metal compounds as represented by the following structural formulas:

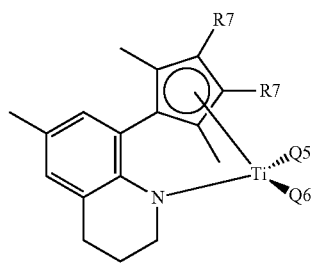

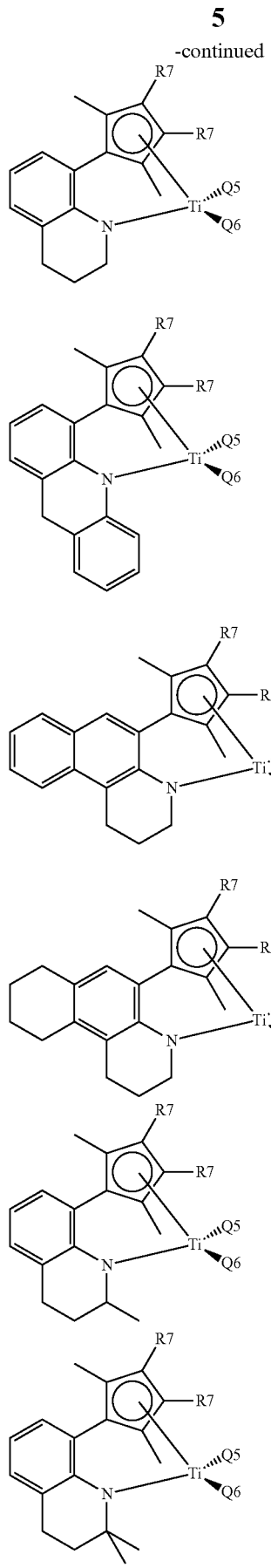
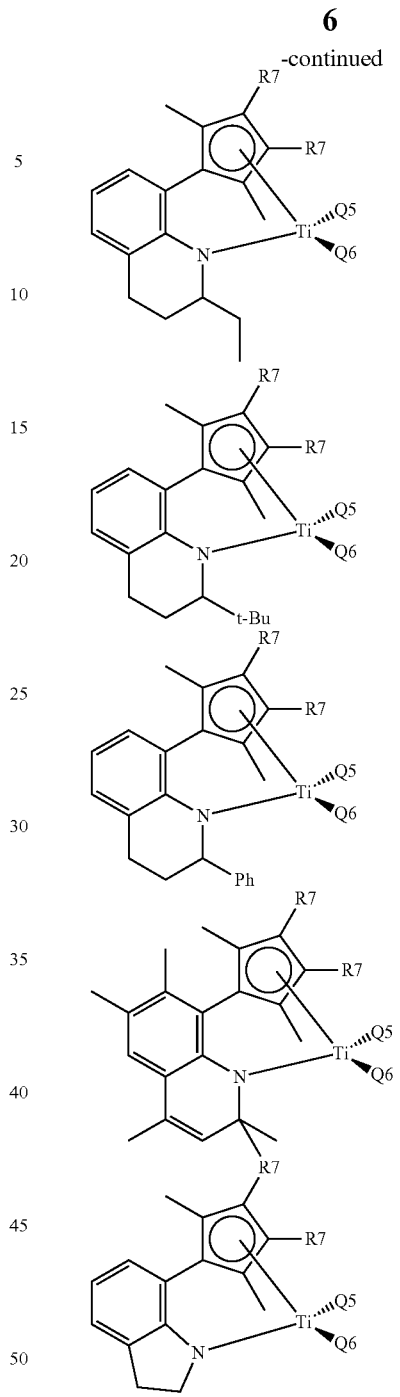

In the above structural formulas, R7s are the same with or different from each other, and are independently selected from hydrogen and a methyl radical, respectively;

Q5 and Q6 are the same with or different from each other, and are independently selected from a methyl radical, a dimethyl amido radical, and a chloride radical.

In the production method of elastomer in accordance with the present invention, the catalyst composition further comprises at least one co-catalyst selected from the group consisting of a compound represented by Chemical Formula 4, a compound represented by Chemical Formula 5, and a compound represented by Chemical formula 6, as follows.

—[Al(R8)—O]$_n$—  [Chemical Formula 4]

In Chemical Formula 4,

R8s are the same with or different from each other, and are independently a halogen; a C1 to C20 hydrocarbon; or a C1 to C20 hydrocarbon substituted with a halogen; and n is an integer of at least 2.

$$D(R8)_3 \quad \text{[Chemical Formula 5]}$$

In Chemical Formula 5, R8 is the same as defined above; and D is aluminum or boron.

$$[L\text{-}H]^+[ZA_4]^-$$

or $$[L]^+[ZA_4]^- \quad \text{[Chemical Formula 6]}$$

In Chemical Formula 6, L is a neutral or cationic Lewis acid; and H is a hydrogen atom; Z is an element of Group 13; and As are the same with or different from each other, and are independently a C6 to C20 aryl group or a C1 to C20 alkyl group unsubstituted or substituted with a halogen, a C1 to C20 hydrocarbon, an alkoxy group or a phenoxy group for at least one hydrogen atom therein.

Examples of the compound represented by Chemical Formula 4 include methyl aluminoxane, ethyl aluminoxane, isobutyl aluminoxane, butyl aluminoxane, and the like. Examples of the compound as represented by Chemical Formula 5 are selected from trimethyl aluminium, triethyl aluminium, triisobutyl aluminium, tripropyl aluminium, tributyl aluminium, dimethylchloroaluminium, triisopropyl aluminium, tri-s-butyl aluminium, tricyclopentyl aluminium, tripentyl aluminium, triisopentyl aluminium, trihexyl aluminium, trioctyl aluminium, ethyl dimethyl aluminium, methyldiethyl aluminium, triphenyl aluminium, tri-p-tolyl aluminium, dimethyl aluminium methoxide, dimethyl aluminium ethoxide, trimethyl boron, triethyl boron, triisobutyl boron, tripropyl boron, and tributyl boron.

The compound as represented by Chemical Formula 6 includes a non-coordinated combinative anion compatible with a Bronsted acid cation. The anions may be the ones having a relatively large size and comprising a single coordinate bond complex compound containing a metalloid. In particular, commonly used are the compounds having a single boron atom at an anion site. In this respect, the compound represented by Chemical Formula 6 may be a salt comprising an anion including a coordinating bond complex compound with a single boron atom.

Specific examples of such compound include, in case of trialkyl ammonium salt, trimethyl ammonium tetrakis(pentafluorophenyl)borate, triethyl ammonium tetrakis(pentafluorophenyl)borate, tripropyl ammonium tetrakis(pentafluorophenyl)borate, tri(n-butyl)ammonium tetrakis (pentafluorophenyl)borate, tri(2-butyl)ammonium tetrakis (pentafluorophenyl)borate, N,N-dimethylanilinium tetrakis (pentafluorophenyl)borate, N,N-dimethylanilinium n-butyl tris(pentafluorophenyl)borate, N,N-dimethylanilinium benzyl tris(pentafluorophenyl)borate, N,N-dimethylanilinium tetrakis(4-(t-butyl dimethylsilyl)-2,3,5,6-tetrafluorophenyl) borate, N,N-dimethylanilinium tetrakis(4-triisopropylsilyl)-2,3,5,6-tetrafluorophenyl)borate, N,N-dimethylanilinium pentafluorophenoxy tris(pentafluorophenyl)borate, N,N-diethylanilinium tetrakis(pentafluorophenyl)borate, N,N-dimethyl-2,4,6-trimethylanilinium tetrakis(pentafluorophenyl) borate, trimethyl ammonium tetrakis(2,3,4,6-tetrafluorophenyl)borate, triethyl ammonium tetrakis(2,3,4,6-tetrafluorophenyl)borate, tripropyl ammonium tetrakis(2,3,4,6- tetrafluorophenyl)borate, tri(n-butyl)ammonium tetrakis(2,3,4,6-tetrafluorophenyl)borate, dimethyl(t-butyl) ammonium tetrakis(2,3,4,6-tetrafluorophenyl)borate, N,N-dimethylanilinium tetrakis(2,3,4,6- tetrafluorophenyl)borate, N,N-diethylanilinium tetrakis(2,3,4,6-tetrafluorophenyl)borate, N,N-dimethyl-2,4,6-trimethylanilinium tetrakis(2,3,4, 6-tetrafluorophenyl)borate, decyldimethyl ammonium tetrakis(pentafluorophenyl)borate, dodecyldimethyl ammonium tetrakis(pentafluorophenyl)borate, tetradecyldimethyl ammonium tetrakis(pentafluorophenyl)borate, hexadecyldimethyl ammonium tetrakis(pentafluorophenyl) borate, octadecyldimethyl ammonium tetrakis(pentafluorophenyl)borate, eicosyldimethyl ammonium tetrakis(pentafluorophenyl)borate, methyldidecyl ammonium tetrakis (pentafluorophenyl)borate, methyldidodecyl ammonium tetrakis(pentafluorophenyl)borate, methylditetradecyl ammonium tetrakis(pentafluorophenyl)borate, methyldihexadecyl ammonium tetrakis(pentafluorophenyl)borate, methyldioctadecyl ammonium tetrakis(pentafluorophenyl)borate, methyldieicosyl ammonium tetrakis (pentafluorophenyl)borate, tridecyl ammonium tetrakis (pentafluorophenyl)borate, tridodecyl ammonium tetrakis (pentafluorophenyl)borate, tritetradecyl ammonium tetrakis (pentafluorophenyl)borate, trihexadecyl ammonium tetrakis (pentafluorophenyl)borate, trioctadecyl ammonium tetrakis (pentafluorophenyl)borate, trieicosyl ammonium tetrakis (pentafluorophenyl)borate, decyldi(n-butyl)ammonium tetrakis(pentafluorophenyl)borate, dodecyldi(n-butyl)ammonium tetrakis(pentafluorophenyl)borate, octadecyldi(n-butyl)ammonium tetrakis(pentafluorophenyl)borate, N,N-didodecylanilinium tetrakis(pentafluorophenyl)borate, N-methyl-N-dodecylanilinium tetrakis(pentafluorophenyl) borate, and methyl di(dodecyl)ammonium tetrakis(pentafluorophenyl)borate.

In addition, for a dialkyl ammonium salt, mentions may be made of di-(i-propyl)ammonium tetrakis(pentafluorophenyl) borate, and dicyclohexyl ammonium tetrakis(pentafluorophenyl)borate.

In addition, for a carbonium salt, mentions may be made of tropylium tetrakis(pentafluorophenyl)borate, triphenylmethylium tetrakis(pentafluorophenyl)borate, and benzene (diazonium) tetrakis(pentafluorophenyl)borate.

In the production method of elastomers according to the present invention, the catalyst composition can be prepared by the method comprising the steps of contacting a transition metal compound represented by Chemical Formula 1 with a compound represented by Chemical Formula 4 or Chemical Formula 5 to obtain a mixture; and adding a compound represented by Chemical Formula 6 to the mixture.

In the catalyst composition, the molar ratio of the transition metal compound represented by Chemical Formula 1 to the compound represented by Chemical Formula 4 or Chemical Formula 5 may be between 1:5 and 1:500. Further, the molar ratio of the transition metal compound represented by Chemical Formula 1 to the compound represented by Chemical Formula 6 may be between 1:1 and 1:10. However, the present invention is not limited thereto.

In the production method of the elastomers according to the present invention, the catalyst composition may further include a reaction solvent, the examples of which include, but are not limited to, a hydrocarbon solvent such as pentane, hexane, and heptanes; an aromatic solvent such as benzene and toluene; and the like.

In the production method of elastomers according to the present invention, the diene monomers can comprises a diene monomer selected from the group consisting of a conjugated diene monomer and an unconjugated diene monomer.

For the conjugated diene monomer, mentions may be made of butadiene, isoprene, 2,3-dimethylbutadiene-1,3, 1,2-dimethylbutadiene-1,3, 1,4-dimethylbutadiene-1,3, 1-ethylbutadiene-1,3, 2-phenylbutadiene-1,3, hexadiene-1,3, 4-methylpentadiene-1,3, 1,3-pentadiene, 3-methyl-1,3-pentadiene, 2,4-dimethyl-1,3-pentadiene, 3-ethyl-1,3-pentadiene, and the like, but the present invention is not limited thereto.

For the unconjugated diene monomer, mentions may be made of an aliphatic diene monomer, a cyclic diene monomer, an aromatic diene monomer, a triene monomer, and the like.

Examples of the aliphatic diene monomer include, but are not limited to, 1,4-pentadiene, 1,4-hexadiene, 1,5-hexadiene, 2-methyl-1,5-hexadiene, 1,6-heptadiene, 6-methyl-1,5-heptadiene, 1,6-octadiene, 1,7-octadiene, 7-methyl-1,6-octadiene, 1,13-tetradecadiene, and 1,19-eicosadiene. Examples of the cyclic diene monomer include, but are not limited to, 1,4-cyclohexadiene, bicyclo[2.2.1]hept-2,5-diene, 5-ethylidene-2-norbornene, 5-methylene-2-norbornene, 5-vinyl-2-norbornene, bicyclo[2,2,2]oct-2,5-diene, 4-vinylcyclohex-1-ene, bicyclo[2,2,2]oct-2,6-diene, 1,7,7-trimethylbicyclo-[2,2,1]hept-2,5-diene, dicyclopentadiene, methyl tetrahydro indene, 5-allylbicyclo[2,2,1]hept-2-ene, and 1,5-cyclooctadiene.

Examples of the aromatic diene monomer include, but are not limited to, 1,4-diallylbenzene and 4-allyl-1H-indene.

Examples of the triene monomer include, but are not limited to 2,3-diisoprophenylidene-5-norbornene, 2-ethylidene-3-isopropylidene-5-norbornene, 2-prophenyl-2,5-norbonadiene, 1,3,7-octatriene, and 1,4,9-decatriene.

In the production method of elastomers according to the present invention, the elastomer can be an elastomer comprising ethylene and propylene or an elastomer comprising ethylene, propylene, and a diene monomer.

In the production method of elastomers according to the present invention, the ethylene content in the elastomer comprising ethylene and propylene may be 20-90% by weight and the propylene content therein may be 10-80% by weight. For example, the ethylene content is 30-85% by weight or 30-80% by weight, and the propylene content is 15-70% by weight or 20-70% by weight.

In the elastomer comprising ethylene, propylene, and a diene monomer, the ethylene content is at least 20% by weight but less than 90% by weight, the propylene content is 10-80% by weight, and the diene content is greater than 0 but no more than 20% by weight. For example, the ethylene content is at least 30% by weight but less than 85% by weight, the propylene content is 15-70% by weight, and the diene monomer content is greater than 0 but no more than 17% by weight. According to another example, the ethylene content is at least 30% by weight but less than 80% by weight, the propylene content is 20-70% by weight, and the diene monomer content is greater than 0 but no more than 15% by weight.

In the production method of elastomers according to the present invention, the polymerization can be carried out under previously known conditions, such as at a temperature of 0° C. to 250° C. and under a pressure of atmospheric pressure to 1000 atmospheres. Further, one can use the conditions according to the polymerization methods such as a suspension, a solution, a slurry, a gas phase, or other polymerization methods if desired, for example, a continuous solution polymerization method. For employing the continuous solution polymerization, the polymerization temperature is advantageously from 100° C. to 180° C. A carrier may be used. Alternatively, the catalyst may be used in a homogeneous manner, being dissolved in a solution.

In addition, the present invention provides an elastomer prepared by the production method of elastomers according to the present invention.

The elastomer in accordance with the present invention is characterized in that it has a high incorporation degree of comonomers such as propylene and a diene monomer, a high conversion rate, and an enhanced activity. According to the prior art, due to the technological and economic reasons, incorporation degree of the diene monomers was hard to increase. However, according to the present invention, using the catalyst composition comprising the transition metal compound as represented by Chemical Formula 1 makes it possible to easily increase the incorporation rate of the diene monomers, a conversion rate, and the like.

The molecular weight distribution (Mw/Mn) of the elastomer according to the present invention can range from 1.5 to 15, from 1.8 to 10, or from 2 to 6.

The weight average molecular weight of the elastomer of the present invention can range from 10,000 to 1,000,000, from 20,000 to 800,000, from 40,000 to 600,000, or from 60,000 to 500,000.

Typically, the viscosity of an elastomer is characterized by Mooney viscosity as measured at 125° C. by using a shear rheometer according to ASTM D 1646-89.

Mooney viscosity of the elastomer according to the present invention may range from 1 to 150, from 5 to 125, from 10 to 100, or from 15 to 80.

In addition, the density of the elastomer can be measured in accordance with ASTM D-792, and the density of the elastomer of the present invention may range from 0.850 to 0.895 g/cm$^3$, from 0.853 to 0.885 g/cm$^3$, or from 0.855 to 0.875 g/cm$^3$.

EXAMPLES

Hereinafter, the present invention will be explained based on the following examples, which are merely illustrative of the present invention, and the scope of the present invention should not be construed to be defined thereby.

Example

Synthesis of Ligands and Metal Compounds

Organic reagents and solvents as commercially obtained from Aldrich Co. Ltd. and Merk Co. Ltd were used after being subjected to a standard purification procedure. All the steps for the synthesis were conducted in the absence of any contact with air and moisture to enhance reproducibility of experiments. In order to characterize the structure of compounds produced in the following examples, a 400 MHz nuclear magnetic resonance (NMR) spectrometer and an X-ray spectrometer were used and thereby each spectrum and diagram could be obtained.

The production methods of the catalyst of Chemical Formula 1 as used in the examples herein are set forth in Korean Patent No. 0,820,542 and Korean Patent No. 098055.

The catalyst as used in the comparative examples, dimethylsilyl (t-butylam ido)(tetramethyl cyclopentadienyl)titanium dichloride of DOW, was purchased from Boulder Scientific, Co. Ltd. (USA) and used as it was for a reaction for ethylene copolymerization.

Evaluation of the Properties

Melting Index, Melting Point, Mooney Viscosity, Molecular Weight

The melt index (MI) for polymers was measured in accordance with ASTM D-1238 (condition E, 190° C., 2.16 Kg weight).

The melting temperature of the polymer was measured by using Differential Scanning calorimeter 2920 (DSC) manufactured by TA. Co. Ltd. In this regard, the polymer was heated up to 200° C. and maintained at that temperature for 5 minutes, and then cooled to 30° C. and was heated again, determining the top of the DSC curve thus obtained as a melting point. At this time, the heating and cooling rates were 10° C./min and the melting point was obtained during the second heating process.

The density of the polymer was measured by a method wherein a sample as treated with an antioxidant (1,000 ppm) was fabricated with a press mold at 180° C. into a sheet with a thickness of 3 mm and a radius of 2 cm, and then cooled at 10° C./min and weighed at a Mettler balance.

Mooney viscosity of the polymer was measured by using a shear rheometer at 125° C. according to ASTM D 1646-89.

The molecular weight of the polymer was measured by using PL-GPC 220 from Polymer Laboratory Co. Ltd. equipped with three linear mixed bed columns. It was measured at 160° C. with using 1,2,4-trichlorobenzene as a solvent at a flow rate of 1.0 ml/min.

Examples 1 and 2 and Comparative Examples 1 and 2

Preparation of Ethylene-Propylene Elastic Copolymer 1.0 L of a hexane solvent and a desired amount of comonomer, propylene were placed into a 2 L autoclave reactor. The reactor was heated to 120° C. and filled with ethylene at about 35 bar. The catalyst treated with 50 mmol of triisobutyl aluminium (2 mmol) and a cocatalyst solution of dimethylanilinium tetrakis(pentafluorophenyl)borate (10 mmol) were put into a cylinder and then injected into the reactor. The polymerization reaction was carried out with a pressure in the reactor being maintained at 35 bar for 8 minutes by continuous introduction of ethylene. The polymerization temperature was kept as constant as possible by removing the reaction heat via cooling coils inside the reactor. The polymer solution obtained after the polymerization reaction was discharged from the bottom of the reactor and cooled with an excess amount of ethanol. The polymer thus obtained was dried in a vacuum oven over 12 hours.

Example 3 and Comparative Example 3

Preparation of Ethylene-Propylene Elastic Copolymer

In Example 3 and Comparative Example 3, the polymers were prepared in the same manner as set forth in Examples 1 and 2 and Comparative Examples 1 and 2 except for using 1 pmol of a catalyst treated with 25 pmol of triisobutyl aluminium compound and 5 pmol of a cocatalyst (dimethylanilinium tetrakis(pentafluorophenyl)borate) solution.

The polymerization conditions of Examples 1 to 3 and Comparative Examples 1 to 3 are set forth in Table 1 and the properties of the polymers thus obtained are set forth in Table 2 as follows.

TABLE 1

|  | Propylene (M) | Polymerization Initiation Temp. (° C.) | Max. Polymerization Temp. (° C.) |
|---|---|---|---|
| Example 1 | 2.0 | 120 | 155.2 |
| Example 2 | 1.2 | 120 | 170.6 |
| Example 3 | 0.8 | 120 | 130.4 |
| Comparative Example 1 | 2.0 | 120 | 126.6 |
| Comparative Example 2 | 1.2 | 120 | 124.5 |
| Comparative Example 3 | 1.6 | 120 | 122.2 |

* Propylene (M): Molarity (mol/l) of propylene comonomer in the reactor

TABLE 2

|  | Activity (kg/mmol-Ti hr) | Melt index (g/10 min) | Density (g/cc) | Tm (□) | C2 (wt %) | C3 (wt %) | C3 conversion (wt %) |
|---|---|---|---|---|---|---|---|
| Example 1 | 176.3 | 0.18 | 0.853 | — | 68.1 | 31.9 | 13.9 |
| Example 2 | 272.3 | 0 | 0.865 | 42.8 | 72.0 | 28.0 | 34.5 |
| Example 3 | 129.0 | 0 | 0.875 | 53.2 | 75.0 | 25.0 | 11.5 |
| Comparative Example 1 | 150.4 | 0.10 | 0.861 | 46.4 | 67.9 | 32.1 | 4.51 |
| Comparative Example 2 | 103.5 | 0 | 0.891 | 82.2 | 83.0 | 17.0 | 8.02 |
| Comparative Example 3 | 122.2 | 0 | 0.875 | 61.7 | 74.4 | 25.6 | 1.42 |

C2(wt %): weight percentage of ethylene in each copolymer;
C3(wt %): weight percentage of propylene in each copolymer.

In Tables 1 and 2, the catalyst as used in the examples was 1,2,3,4-tetrahydroquuinoline-8-yl)tetramethylcyclopentadienyl-N]titanium dimethyl and the catalyst as used in the comparative examples was dimethylsilyl (t-butylamido)(tetramethyl cyclopentadienyl) titanium dichloride of Dow Co. Ltd.

As can be seen from the results of Table 1 and Table 2, when compared with the catalyst of the comparative examples, the catalyst of the present invention exhibited an excellent activity at a high temperature and a higher level of the propylene conversion rate, indicating that it is very suitable for the preparation of a elastomer having a low density. In comparison with Comparative Example 1, even under the same polymerization conditions, the catalyst of Example 1 produced a polymerization heat of at least 30° C. and its propylene conversion rate was at least three times higher than that of the catalyst of the comparative examples, providing an elastomer having a very low density. In comparison with Comparative Example 2, the catalyst of Example 2 showed more significant differences. In case of the catalyst of the present invention, the polymerization heat as generated was over 50° C., and its activity was at least 2.7 times higher than that of the comparative example and the incorporation degree of the propylene comonomer was so high that an elastomer thus obtained had a propylene content of 28% together with a density of 0.865 g/cc. It also showed a propylene conversion rate at least 4 times higher than that of the comparative example, indicating that the catalyst of the present invention can produce an ethylene-propylene elastic copolymer much more economically at a high temperature than the catalyst of the comparative examples.

In Example 3 and Comparative Example 3, the catalyst efficiencies of the present invention and the comparative examples were compared when they were used for producing an elastomer with a density of 0.875 g/cc. The catalyst of the present invention has a catalytic efficiency at least 5 times higher than that of the comparative example, showing a higher conversion rate of propylene at a higher temperature.

Examples 4 to 6 and Comparative Examples 4 to 6

Preparation of elastic terpolymer of ethylene, propylene, and 5-ethylidene-2-norbornene 1.0 L of hexane and a suitable amount of 5-ethylidene-2-norbornene (ENB) were put into a 2 L autoclave reactor. The reactor was heated to a polymerization temperature of 115° C. and then propylene was added thereto until the reactor was filled with it at a pressure of 7.5 bar. Then, ethylene was added to the reactor until its pressure reached about 16 bar. 5 mmol of a catalyst treated with 125 mmol of a triisobutyl aluminium compound and 25 mmol of a cocatalyst solution of dimethylanilinium tetrakis(pentafluorophenyl)borate were put into a cylinder and then injected into the reactor. The polymerization reaction was carried out with a pressure in the reactor being maintained at 16 bar for 8 minutes by continuous introduction of ethylene. The polymerization temperature was kept as constant as possible by removing the reaction heat via cooling coils inside the reactor. The polymer solution obtained after the polymerization reaction was discharged from the bottom of the reactor and cooled with an excess amount of ethanol. The polymer thus obtained was dried in a vacuum oven over 12 hours.

Properties of the polymers as prepared by Examples 4 to 6 and Comparative Examples 4 to 6 are shown in Table 3.

As shown in Table 3, in the production of EPDM, the catalyst of the examples of the present invention yielded an elastomer having a higher molecular weight in comparison with the catalyst of the comparative examples.

In addition, it can be found that the catalyst of the examples of the present invention produced the polymer having a higher content of 5-ethylidene-2-norbornene and was a more suitable catalyst for the production of EPDM in light of the diene conversion.

What is claimed is:

1. A method of producing an ethylene-propylene-diene elastomer, which comprises a step of polymerizing ethylene, propylene, and a diene monomer in the presence of a catalyst composition comprising (1,2,3,4-tetrahydroquinoline-8-yl)[tetramethylcyclopentadienyl-N]titanium dimethyl;

wherein the step of polymerizing is a continuous solution polymerization;

wherein the ethylene-propylene-diene elastomer has a density of 0.860-0.895 g/cm$^3$, and wherein the ethylene-propylene-diene elastomer has an ethylene content of being at least 20% by weight but less than 90% by weight, a propylene content of 10 to 80% by weight, and a diene monomer content of being greater than 0 but no more than 20% by weight.

2. The method of producing an elastomer according to claim 1, wherein the diene monomer is selected from the group consisting of 5-ethylidene-2-norbornene, 1,4-hexadiene, and dicyclopentadiene.

3. The method of producing an elastomer according to claim 1, wherein the catalyst composition further comprises at least one cocatalyst selected from the group consisting of a compound represented by Chemical Formula 4, a compound represented by Chemical Formula 5, and a compound represented by Chemical Formula 6:

—[Al(R8)-O]$_n$—      [Chemical Formula 4]

in Chemical Formula 4,

R8s are the same with or different from each other, and are independently a halogen; a C1 to C20 hydrocarbon; or a C1 to C20 hydrocarbon substituted with a halogen; and n is an integer of at least two;

D(R8)$_3$      [Chemical Formula 5]

in Chemical Formula 5, R8 is the same as defined in Chemical Formula 4; and D is aluminum or boron; and

[L]$^+$[ZA$_4$]$^-$      [Chemical Formula 6]

TABLE 3

| | ENB(M) | Yield (g/8 min) | Activity (Kg/mmol-Ti hr) | Mw | Mooney viscosity | C2 (wt %) | C3 (wt %) | ENB (wt %) | ENB conversion rate (wt %) |
|---|---|---|---|---|---|---|---|---|---|
| Example 4 | 0 | 53.7 | 80.5 | 139,590 | 10.9 | 46.0 | 54.0 | 0 | 0 |
| Example 5 | 0.05 | 43.8 | 65.7 | 160,335 | 15.8 | 38.0 | 54.6 | 7.4 | 50.6 |
| Example 6 | 1 | 32.8 | 49.2 | 189,082 | 25.6 | 39.2 | 47.8 | 13.0 | 34.2 |
| Comparative Example 4 | 0 | 56.7 | 85.1 | 53,897 | ND | — | — | 0 | 0 |
| Comparative Example 5 | 0.05 | 54.0 | 81.0 | 51,551 | ND | 44.3 | 50.3 | 5.3 | 45.8 |
| Comparative Example 6 | 1 | 49.5 | 74.2 | 61,115 | ND | 42.1 | 50.0 | 7.9 | 31.3 |

C2 (wt %): weight percentage of ethylene in each copolymer;
C3 (wt %): weight percentage of propylene in each copolymer;
ENB (wt %): weight percentage of 5-ethylidene-2-norbornene in each copolymer;
ND: too low viscosity, cannot be measured.

in Chemical Formula 6, L is a neutral or cationic Lewis acid; Z is an element of Group 13; and A is a C6 to C20 aryl group or a C1 to C20 alkyl group, unsubstituted or substituted with a halogen, a C1 to C20 hydrocarbon, an alkoxy group, or a phenoxy group for at least one hydrogen atom therein.

4. The method of producing an elastomer according to claim 3, wherein the catalyst composition is obtained by a method comprising the steps of contacting a transition metal compound represented by Chemical Formula 1 with a compound represented by Chemical Formula 4 or Chemical Formula 5 to obtain a mixture; and adding to the mixture a compound represented by Chemical Formula 6.

5. The method of producing an elastomer according to claim 4, wherein the molar ratio of the transition metal compound represented by Chemical Formula 1: the compound represented by Chemical Formula 4 or Chemical Formula 5 is from 1:5 to 1:500.

6. The method of producing an elastomer according to claim 4, wherein the molar ratio of the transition metal compound represented by Chemical Formula 1: the compound represented by Chemical Formula 6 is from 1:1 to 1:10.

\* \* \* \* \*